Patented Sept. 11, 1923.

1,467,825

UNITED STATES PATENT OFFICE.

JAMES C. ARMOR, OF WEST VIEW BOROUGH, PENNSYLVANIA.

ARC-WELDING COMPOSITION.

No Drawing.   Application filed August 9, 1921. Serial No. 490,919.

*To all whom it may concern:*

Be it known that I, JAMES C. ARMOR, a citizen of the United States, and residing in the borough of West View, in the county of Allegheny and State of Pennsylvania, have invented or discovered the new, useful, and Improved Arc-Welding Composition, of which the following is a specification.

My invention consists of a new and improved compound for use in connection with electric-arc welding, for the purposes, inter alia, of using a lower impressed voltage than is now possible with the compounds now in general use, and of obtaining a dense, uniform weld of great strength, and free from slag and other impurities.

Generally speaking, my improved compound is characterized by zirconia. Thus I may use a zirconate of an alkali, such as sodium zirconate. Or, I may use zircon or any other natural form of zirconium, together with an alkali or alkali earth.

Where zirconia in a neutral or acid form, is used, it must be combined with an alkaline substance, as by precipitation or fusion.

Thus I may fuse pure zirconia ($ZrO_2$) with an equal weight of soda ash. If zircon is to be used, I fuse ten parts of zircon with twelve parts of soda ash.

The percentage of sodium may be varied through wide limits, or it may be replaced, either entirely or in part by lithium, potassium, calcium, strontium or barium.

Thus, instead of soda ash, I may use potassium carbonate, obtaining potassium zirconate; or I may use lithium carbonate, obtaining lithium zirconate.

This product may be used alone as a welding compound, but I prefer to dilute or combine the same with a suitable flux having a melting point near, preferably lower than, the melting point of the metal to be welded.

Thus, where mild steel is to be welded, I use a flux composed of silicates of iron, aluminum and manganese, together with, preferably, an alkaline substance or substances.

Thus I may use the following formula for the purpose:

|  | Weight. |
|---|---|
| Sodium zirconate | 6% |
| Clay | 38% |
| Ferric oxide | 10% |
| Manganese dioxide | 8% |
| Soda ash | 38% |
|  | 100% |

These elements are preferably fused together and then pulverized; or they may be merely pulverized and thoroughly mixed.

The percentage of clay may vary or it may be replaced to a greater or less extent by silica or alumina.

The metallic oxides may vary through wide limits or be entirely absent.

For special purposes, I may add other substances, such, for instance, as powdered aluminum, to purify the metal, or nickel to form nickel steel.

In use, the composition is applied to the wire or rod which forms the electrode, and as the wire or rod is melted to form the weld, the zirconia enters the weld and causes the formation of a dense, uniform and very strong weld.

The flux is fused and rises to float on the surface of the metal forming the weld, dissolving out the impurities in the metal, and, by the formation of a protective coating, preventing the oxidation and the absorption of nitrogen from the atmosphere. The flux also serves to dilute the zirconate and thus cheapen the composition.

What I desire to claim is:—

1. An arc-welding composition containing zirconia.

2. An arc-welding composition containing zirconia combined with an alkaline substance.

3. An arc-welding composition containing zirconia combined with a flux.

Signed at Pittsburgh, Pa., this 6th day of August, 1921.

JAMES C. ARMOR.